United States Patent Office 2,967,840
Patented Jan. 10, 1961

2,967,840

POLYESTERS OF 4,5-EPOXYCYCLOHEXANE-1,2-DICARBOXYLIC ACIDS

Benjamin Phillips and Paul S. Starcher, Charleston, W. Va., assignors to Union Carbide Corporation, a corporation of New York No Drawing. Filed Dec. 27, 1956, Ser. No. 630,765

16 Claims. (Cl. 260—22)

This invention relates to polyesters containing oxirane rings and more particularly to 4,5-epoxycyclohexane-1,2-dicarboxylic polyesters and to methods for preparing them. This application is a continuation-in-part of application, Serial Number 374,142, filed August 13, 1953, now abandoned.

Our polyesters have many valuable properties making them particularly useful in the synthetic resins art. They may be used as polymerizable compositions in the preparation of alkyd resins, modified alkyd resins, and related resins. In that they contain oxirane rings, our polyesters are capable of reaction with organic compounds containing active hydrogen atoms, for example, polyfunctional amines, polyhydric alcohols, polyhydric phenols, polycarboxylic acids and anhydrides and the like to produce resins. Infusible insoluble resins finding particular applications as coatings, laminates, adhesives, and castings may be thus obtained. In this use our epoxy polyesters are especially valuable in that substantially no shrinkage occurs during resin forming reactions.

The epoxy polyesters of this invention are compatible with many resin systems and are of low volatility. Having these properties our polyesters can be employed as plasticizers for cellulose resins, polyvinyl resins, rubber and other resins and plastics. As plasticizers our polyesters are capable of imparting advantageous properties to such resin systems. Our polyesters are of further use as heat and light stabilizers for chlorine containing resins which tend to discolor and deteriorate upon exposure to strong sunlight or the ravages of nature for prolonged periods. Examples of such chlorine containing resins are polyvinyl chloride, polyvinylidene chloride, and chlorinated synthetic rubbers.

Our polyesters are also valuable as modifiers in the manufacture of condensation resins, such as, phenol-formaldehyde resins, urea-formaldehyde resins, melamine-formaldehyde resins and the like. As modifiers in condensation resins our polyesters are capable of participating in the condensation reactions thus imparting special properties to the resins. In this manner, toughness may be imparted to such resins which were heretofore brittle and their uses can be thereby extended.

The epoxy polyesters of this invention can be made so as to contain olefinic double bonds as well as oxirane rings. Such polyesters can be polymerized with other olefinic double bond containing monomers, such as, vinyl chloride, styrene and the like. Polymers formed in this manner can tenaciously adhere to such impervious materials as metals and glass and are valuable in the manufacture of laminates for these materials. Fiber glass laminates showing a high degree of resistance to permeation by water, for example, may be manufactured from our polyesters.

In producing our 4,5-epoxycyclohexane-1,2-dicarboxylic polyesters, a peroxidic epoxidizing agent is employed to epoxidize the olefinic double bonds of 4-cyclohexene-1,2-dicarboxylic polyesters which will be hereinafter referred to as the unsaturated polyesters. As epoxidizing agents, any one of several peracids, for example, perbenzoic acid, peracetic acid and the like, can be employed. However, it is preferable to use the peracids and aldehyde monoperacylates obtained by the reaction of elemental oxygen and saturated aliphatic aldehydes having from two to three carbon atoms. Peroxides obtained in this manner are substantially free of inorganic ionic impurities which tend to encourage side reactions involving the oxirane ring during and after epoxidation. The epoxidation of an olefinic carbon group employing peracetic acid can be represented by the equation:

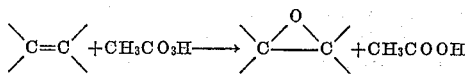

When an aliphatic aldehyde monoperacylate such as acetaldehyde monoperacetate is employed as epoxidizing agent, the epoxidation may be represented by the following equation:

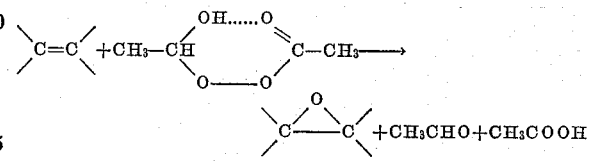

The double bonded carbon atoms

shown in these equations represent an olefinic carbon group. The atoms joined to the carbon atoms of this group are of the class consisting of hydrogen and only such carbon atoms as have not more than one bond thereof in linkage to elements other than carbon or hydrogen. It has been our experience that halogen atoms directly connected to a carbon atoms of an olefinic group do not prevent epoxidation of that olefinic group, but the epoxidation of that olefinic group is retarded. Halogen atoms removed from the olefinic group by one or more carbon atoms also retard the epoxidation of that olefinic group, although the degree of such retardation is not as great as in the case of halogen atoms directly connected to the olefinic group. This retardation and variance in degree of retardation makes possible the selective epoxidation of chlorine-containing unsaturated polyesters such that epoxy polyesters having different degrees of olefinic unsaturation can be made. The presence of carbonyl groups, whether as a part of keto, aldehyde or carboxyl groups, in conjugation with the olefinic group has been found to retard epoxidation of that olefinic group. This retardation by carbonyl groups to the epoxidation of olefinic groups in conjugation thereto makes possible the selective epoxidation of unsaturated polyesters such that epoxy polyesters having different degrees of olefinic unsaturation can be obtained. The presence, however, of alkyl or aryl groups directly attached to the carbon atoms of the olefinic group has been observed to favorably influence epoxidation of that olefinic group and this also makes possible the selective epoxidation of olefinic groups. For example, those olefinic groups having a greater number of alkyl or aryl groups attached to the carbon atoms thereof can be epoxidized to a greater extent than, or substantially to the exclusion of, olefinic groups having hydrogen or a lesser number of alkyl or aryl groups attached to the carbon atoms thereof. By the use of this selectivity in epoxidizing olefinic groups, epoxy polyesters containing different proportions of olefinic groups can be obtained. It has been observed also that aromatic double bonds cannot be epoxidized.

The epoxidation can be carried out by adding the epoxidizing agent to a 4-cyclohexene-1,2-dicarboxylic polyester. It is preferable to add the epoxidizing agent gradually over a period of several hours, although all of the reactants may be added at once, if desired. Reaction temperatures for the epoxidation can be selected from the range of −25° C. to 150° C. At the lower temperatures within this range and at temperatures below this range the epoxidation proceeds at a slower rate and longer reaction times are required to complete the reaction. The efficiencies of epoxidations at the higher temperatures within and at temperatures above this range are lower and lower yields are obtained. Therefore, it is preferable to conduct the epoxidations at temperatures in an intermediate range between about 10° C. and 90° C.

One molecule of epoxidizing agent is theoretically needed to epoxidize one olefinic double bond of 4-cyclohexene-1,2-dicarboxylic polyester. Stated in another way, one mole of epoxidizing agent is required to epoxidize one olefinic double bond equivalent of unsaturated polyester. By the term "olefinic double bond equivalent," as used herein, is meant the number of moles of olefinic carbon groups, for example, one mole of a compound containing one olefinic group to the molecule contains one olefinic double bond equivalent. In practice, in order to epoxidize substantially all of the olefinic double bonds of the unsaturated polyesters, it is preferable to employ ratios of more than one mole of epoxidizing agent per epoxidizable olefinic double bond equivalent. However, ratios equal to or less than one mole of epoxidizing agent to olefinic double bond equivalent can be used, if desired, with resultant unepoxidized olefinic double bonds in the product. In some cases the presence of olefinic unsaturation may be desired in our polyesters, in which event not more than the theoretical amount of epoxidizing agent can be used. For epoxidizing substantially all of the olefinic double bonds of unsaturated polyesters, ratios within the range from 1.00 to 2.00 moles of epoxidizing agent per epoxidizable olefinic double bond equivalent are recommended. Ratios from 0.1 up to one mole of epoxidizing agent per olefinic double bond equivalent are recommended for producing 4,5-epoxycyclohexane-1,2-dicarboxylic polyesters containing olefinic unsaturation, the lower ratios providing a higher degree of unsaturation in our polyesters than the higher ratios. The exact ratio used depends upon the degree of olefinic unsaturation desired in the product. Ratios above and below the ranges specified above can be employed, if desired.

Crystalline or highly concentrated peracids, such as, peracetic acid, are explosive and caution is to be exercised to avoid their formation during use. These hazards attending the use of peracids can be safely avoided by employing them as solutions of less than 60 weight percent in suitable solvents. Acetone, methyl ethyl ketone, ethyl acetate and butyl acetate are particularly well suited as solvents for peracetic acid and the like.

After completion of the epoxidation or when desired, low-boiling components such as solvent, excess peracetic acid, acetic acid and other by-products should be removed from the reaction mixture. This removal of low-boilers can be effected by any suitable means, for example, by distillation or extraction. The removal of low-boilers can be expeditiously accomplished, for example, by feeding the reaction mixture into a still kettle containing a pot-boiler, such as, ethylbenzene, refluxing under reduced pressure and then stripping the low-boiling components. The 4,5-epoxycyclohexane-1,2-dicarboxylic polyester products can be then recovered as residue products.

Starting materials for epoxidation in accordance with this invention are 4-cyclohexene-1,2-dicarboxylic polyesters which can be prepared from 4-cyclohexene-1,2-dicarboxylic acids and polyhydric alcohols using known procedures. In the formation of these unsaturated polyesters the dicarboxylic reactant can be employed in the form of its acid or anhydride. By-product water can be removed by any suitable means. A useful procedure for preparing 4-cyclohexene-1,2-dicarboxylic polyesters comprises mixing and heating the reactants which include 4-cyclohexene-1,2-dicarboxylic acids or anhydrides and polyhydric alcohols. Suitable solvents, such as, toluene or xylene, can be used if desired to provide more favorable reaction media. The reaction temperature may be selected from a wide range although temperatures over about 300° C. are undesirable. Lower temperatures below about 100° C. require longer reaction periods. Temperatures from 100° C. to 200° C. are to be recommended as the most feasible. Temperature control is preferred and can be readily maintained at atmospheric or other pressure by means of a reflux condenser, if desired. However, any suitable temperature control can be employed. The molar ratios of reactants can be varied considerably by using known polyesterification principles to control the size of polyester molecules formed therefrom. The size of polyester molecules also may be controlled by varying the reaction time and temperature. By stopping the reaction short of completion relatively smaller polyester molecules can be obtained whereas continuance towards completion tends to provide relatively larger polyester molecules. Readily oxidizable reactants can be protected from oxidation by providing an inert atmosphere, e.g., carbon dioxide or nitrogen surrounding the reaction mixture. When using 4-cyclohexene-1,2-dicarboxylic acids as acidic reactants in the condensation reactions, by-product water can be removed using means known to the art. Other procedures are available to those skilled in the art. Alcoholysis between 4-cyclohexene-1,2-dicarboxylic simple esters and polyhydric alcohols, for example, can be used also to provide 4-cyclohexene-1,2-dicarboxylic polyesters.

High molecular weight unsaturated polyesters which are solids or semi-solids can be conveniently epoxidized, in the manner set forth herein, as solutions in suitable solvents, e.g., toluene, xylene, acetone, ethyl acetate. Epoxidations can be effectively carried out in such solutions which contain very low concentrations of unsaturated polyester. It is preferred, however, to employ unsaturated polyesters which when dissolved in suitable solvents form liquid solutions having concentrations of at least 10 weight percent of unsaturated polyester.

Representative of the many 4-cyclohexene-1,2-dicarboxylic acids and anhydrides which can be used in preparing unsaturated polyesters are 4-cyclohexene-1,2-dicarboxylic acid and anhydride and the lower alkyl substituted 4-cyclohexene-1,2-dicarboxylic acids and anhydrides, such as, 3-methyl-4-cyclohexene-1,2-dicarboxylic, 3,6-dimethyl-4-cyclohexene-1,2-dicarboxylic, 4-amyl-4-cyclohexene-1,2-dicarboxylic, 3,6-diisopropyl-4-cyclohexene-1,2-dicarboxylic acids and anhydrides and the like. These and many other similar 4-cyclohexene-1,2-dicarboxylic acids and anhydrides can be obtained by a Diels-Alder reaction of conjugated diolefines and maleic acid or lower alkyl substituted maleic acids or anhydrides thereof. Typical conjugated diolefines include 1,3-butadiene, lower alkyl substituted 1,3-butadienes, isoprene, piperylene, 1,3-hexadiene, lower alkyl substituted 1,3-hexadienes, 1,3-pentadiene, 2,4-heptadiene, and the like. As lower alkyl substituted maleic acids and anhydrides, citraconic acid or anhydride, pyrocinchoninic acid or anhydride and the like are illustrative.

The presence of one or more alkyl substituents on the 4-cyclohexene-1,2-dicarboxylic acid or anhydride molecule used in producing our 4,5-epoxycyclohexane-1,2-dicarboxylic polyesters does not in any substantial way alter the use of said polyesters in the manners described herein. In some instances the presence of such substituents on 4-cyclohexene-1,2-dicarboxylic acids or anhydride does enhance the physical properties of epoxy polyesters formed therewith. Furthermore, in forming our epoxy polyesters no deleterious effects attributable to such chemical phenomenon as steric hindrance and the like due to the presence of lower alkyl groups at any of the ring positions of the 4-cyclohexene-1,2-dicarboxylic acid or anhydride are experienced. It is preferred, however, to employ 4-cyclohexene-1,2-dicarboxylic acid or anhydride and lower alkyl substituted 4-cyclohexene-1,2-dicarboxylic acids or anhydrides not having more than five lower alkyl substitutents containing a total of not more than twelve carbon atoms at any of the available positions on its cyclohexene ring. Mixtures of more than one 4-cyclohexene-1,2-dicarboxylic acid or anhydride can be employed also.

Polyhydric alcohols which can be used in the formation of 4-cyclohexene-1,2-dicarboxylic polyesters contain at least two hydroxyl groups attached to two different interconnected aliphatic carbon atoms. Typical polyhydric alcohols can be represented by the general formula:

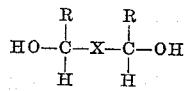

R repersents an alkyl group or hydrogen and can be the same or different for all R's in the molecule. X can represent a single bond or a divalent group composed of a carbon atom or group of carbon atoms interconnected by single or multiple bonds to which such groups as hydrogen, alkyl, hydroxyl, amino, cyclic groups and the like or combinations thereof can be attached. X also represents such divalent groups as oxyalkylene or polyoxyalkylene groups. X may represent nitrogen to which other groups, for example, hydrogen, alkyl, alkanol and the like may be attached or it may represent sulfur. It can also represent cyclic groups such as, phenylene, cyclohexylene and the like. The presence of other groups, with the exception of phenolic and tautomeric enolic groups, not specifically listed herein and not participating in the polyesterification reaction used in preparing unsaturated polyesters is by no means harmful and, in fact, can be useful in developing special properties in our polyesters. Various other polyhydric alcohols are useful in this invention and include the aliphatic cyclic polyols. Such aliphatic cyclic polyols can be represented by the foregoing formula wherein both R's taken together represent an alkylene or substituted alkylene group and X may represent an alkylene group or a single bond. Mixtures of polyhydric alcohols or only one polyhydric alcohol can be employed in forming polyesters for epoxidation in accordance with this invention.

Representative of the polyhydric alcohols which can be employed in preparing the unsaturated polyesters are the glycols and polyoxyalkylene glycols, such as, ethylene glycol, diethylene glycol, polyethylene glycols, propylene glycol, tripropylene glycol, polypropylene glycols, polyethylene-polypropylene glycols, trimethylene glycol, butanediols, pentanediols, 2-ethyl-1,3-hexanediol, 2,5-hexanediol, 2-methyl-2,4-pentanediol, 12,13-tetraconsanediol, 2-butene-1,4-diol, 2-methoxymethyl-2,4-dimethyl-1,5-pentanediol, diethanolamine, triethanolamine, glycerols, polyglycerols, pentaerithritol, sorbitol, polyvinyl alcohols, cyclohexanediols, cyclopentanediols, inositol, and the like. Dihydric alcohols free of acetylenic unsaturation and composed of carbon, hydrogen and oxygen combined as hydroxyl oxygen or ether oxygen connecting two otherwise unconnected carbon atoms and having not more than 24 carbon atoms are preferred. The alkylene glycols and polyoxyalkylene glycols are particularly preferred.

Our polyesters can be modified by the inclusion of monocarboxylic acids or monohydric alcohols with the polyhydric alcohols and dicarboxylic reactants employed in preparing the unsaturated polyesters. These monohydric compounds can be used to promote the formation of small molecules, to alter the solubility, to lower the acidity and for other purposes. Monocarboxylic acids which can be employed for accomplishing these and other purposes include the fatty acids such as those which can be derived from animal and vegetable oils including linseed, soya, oiticica, tung, cottonseed, perilla oils and the like. They can be employed as mixtures, for example, as in non-drying, semi-drying or drying oils, or alone as individual compounds. They may be obtained also from the oxidation of petroleum products or by chemical synthesis. The monocarboxylic acids may comprise open chain, branched chain or cyclic groups and can be saturated or unsaturated. In addition, they can contain such groups as halogen, amino, nitro groups and many others. Typical monocarboxylic acids include acetic acid, butyric acid, lauric acid, stearic acid, lignoceric acid, acrylic acid, crotonic acid, undecylenic acid, oleic acid, linoleic acid, linolenic acid, clupanodonic acid, cyclohexanecarboxylic acids, cyclohexenecarboxylic acids, benzoic acid, toluic acid and the like. Monocarboxylic acids free of acetylenic unsaturation and composed of carbon, hydrogen and oxygen combined only as hydroxyl oxygen or carboxyl carbonyl oxygen and having not more than 18 carbon atoms are preferred. Particularly preferred monocarboxylic acids are the fatty acids. Monohydric alcohols useful in modifying our polyesters may be derived from many sources including hydrogenation of saturated and unsaturated glycerides, oxidation of petroleum products and chemical synthesis. They can be employed individually or as mixtures with other monohydric alcohols. They may comprise open chain, cyclic or branched chain groups in their molecular makeup. They may contain other groups such as amino, nitro, halogen and the like with the exception of phenolic and tautomeric enolic groups. These monohydric alcohols can be saturated or unsaturated. Representative of monohydric alcohols which can be employed in modifying our polyesters are methanol, propanol, butanol, decyl alcohol, lauryl alcohol, cetyl alcohol, stearyl alcohol, 9-heptadecanol, the alkylene and polyalkylene glycol monoethers, e.g., ethylene glycol monoethyl ether, ethylene glycol monophenyl ether, polyethylene glycol monomethyl ether, allyl alcohol, crotyl alcohol, pentenol, 2-ethyl-2-hexenol, 2-cyclopentenol, undecanol, oleyl alcohol, linoleyl alcohol, linolenyl alcohol, 3-cycohexenol, phenylethanol and the like. Monohydric alcohols free of acetylenic unsaturation and composed of carbon, hydrogen and only such oxygen atoms as are connected to carbon or hydrogen and have not more than one bond thereof connected to carbon or hydrogen are preferred. Those composed of not more than 18 carbon atoms are also preferred. Particularly preferred monohydric alcohols are the fatty alcohols.

The properties of our polyesters can be further modified by using other dicarboxylic acids or anhydrides in the reaction mixture of polyhydric alcohol and 4-cyclohexene-1,2-dicarboxylic acid or anhydride in the preparation of unsaturated polyesters for subsequent epoxidation. The oxirane oxygen content per unit weight of our epoxy polyesters can be controlled as desired, for example, by such a use of a saturated or unsaturated acid or anhydride. Through such a use of a saturated dicarboxylic acid or anhydride this oxirane content can be lowered. Our epoxy polyesters obtained in this manner can be particularly important, for example, when reacted with highly reactive active hydrogen compounds wherein it may be desirable to maintain the reaction vigor within easily controllable limits. By such a use of an unsaturated dicarboxylic acid or anhydride which, contains more olefinic carbon groups per unit weight than the 4-cyclohexene-1,2-dicarboxylic acid employed, and such olefinic carbon groups are at least as easily epoxidizable as those of said 4-cyclohexene-1,2-dicarboxylic acid, the oxirane oxygen content per unit weight of our epoxy polyester made therewith can be increased. Such epoxy polyesters can be particularly valuable, for example, when reacted with active hydrogen compounds of low reactivity wherein a more vigorous reaction may be desired. Epoxy polyesters having olefinic groups can also be produced by epoxidizing unsaturated polyesters prepared from polyhydric alcohols, 4-cyclohexene-1,2-dicarboxylic acids and unsaturated dicarboxylic acids or anhydrides having olefinic groups which are not as easily epoxidizable as those contained by said 4-cyclohexene-1,2-dicarboxylic acid, for example, olefinic groups in conjugation with carbonyl groups, such as those contained by maleic acid or anhydride. Such unsaturated epoxy polyesters are particularly valuable in that they may be copolymerized with vinyl compounds, for example, styrene, vinyl chloride and the like, to form a variety of new resins. Further properties of our polyesters, such as, solubility, resin forming properties, viscosity and others can also be modified by the use of dicarboxylic acids or anhydrides in preparing unsaturated polyesters for epoxidation. As modifiers, the dicarboxylic acids can be saturated or unsaturated and may contain open chain, cyclic or branched chain groups. They may contain other groups besides two carboxyl groups, for example, amino, hydroxyl and thio groups. Typical dicarboxylic acids include malonic, succinic, adipic, azelaic, maleic, citraconic, dodecamethylene dicarboxylic, tetracosane dicarboxylic, alkenylsuccinic, e.g., ethylbutenylsuccinic, 2-hexene-1,6-dicarboxylic, cyclohexanedicarboxylic, phthalic, phenylenediacetic acids and anhydrides and the like. Dicarboxylic acids which are preferred for use in modifying our polyesters are composed of carbon, hydrogen and oxygen combined only as carboxyl carbonyl oxygen or hydroxyl oxygen. The preferred dicarboxylic acids can be saturated or unsaturated but are free of acetylenic unsaturation. It is further preferred that the diacyl groups derived from 4-cyclohexene-1,2-dicarboxylic acids or anhydrides constitute at least about 10 percent of the total number of the carboxylic diacyl groups contained by the modified unsaturated polyesters prepared for epoxidation.

Further modifications of our polyesters are also possible by the use of hydroxymonocarboxylic acids or lactones in the reaction mixture of polyhydric alcohols and 4-cyclohexene-1,2-dicarboxylic acids or anhydrides used in preparing unsaturated polyesters for epoxidation. Typical hydroxymonocarboxylic acids include glycollic acid, mandelic acid, hydroxybutyric acid, and typical lactones are caprolactones, valerolactones and the like.

Our epoxy polyesters can be characterized as polyesters of polyhydric alcohols having as divalent acyl groups, 4,5-epoxycyclohexane-1,2-dicarbonyl groups which can be represented by the formula:

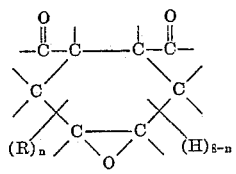

wherein R is a lower alkyl group, $n$ is an integer not greater than five and the total number of carbon atoms contained by $(R)_n$ is not greater than twelve. As a preferred embodiment of our invention, our epoxy polyesters have at least about 50 percent of the oxirane oxygen contained thereby attached to the 4,5 ring positions of constituent cyclohexane-1,2-dicarbonyl groups.

Particularly valuable resins can be obtained from the copolymerization of vinyl compounds with those epoxy polyesters of our invention which contain olefinic groups. An epoxy polyester which can be produced by the epoxidation of unsaturated polyesters prepared from a dihydric alcohol, a 4-cyclohexene-1,2-dicarboxylic acid or anhydride and maleic acid or anhydride, for example, contains reactive olefinic groups which remain unepoxidized because of the hindering effect of carbonyl groups in conjugation therewith. The relative proportions of oxirane oxygen and olefinic groups contained by such epoxy polyesters can be easily controlled, as desired, by adjusting the relative molar amounts of dicarboxylic acids employed in preparing the unsaturated polyesters for epoxidation. In this manner epoxy polyesters having a wide range of olefinic group content can be obtained to fit specific requirements. One particularly important use of such unsaturated epoxy polyesters is in copolymerization with a vinyl compound in the manufacture of glass laminates. Glass laminates having notably high resistance to permeation by fluids, especially water, and subsequent deterioration caused thereby can be manufactured from a vinyl compound, such as, styrene and our unsaturated epoxy polyesters which contain olefinic groups in conjugation with carbonyl groups such as those obtained by the epoxidation of maleic anhydride-dihydric alcohol-4-cyclohexene-1,2-dicarboxylic anhydride polyesters. For example, glass laminates having improved water resistance can be manufactured by using as a binder for glass, styrene and unsaturated epoxy polyesters having as little as about 15 percent to 25 percent of the constituent diacyl groups represented by 4,5-epoxycyclohexane-1,2-dicarbonyl groups, e.g.,

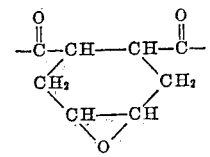

or lower alkyl substituted 4,5-epoxycyclohexane-1,2-dicarbonyl groups, and the remainder represented by maloyl groups.

The following examples are presented.

In these examples the analysis for the oxirane oxygen content of an epoxide sample is based upon its reaction with pyridine hydrochloride to form pyridine and the corresponding chlorhydrin of the epoxide. This analysis can be performed, for example, by introducing into a pressure bottle, containing 25 milliliters of 1 N pyridine hydrochloride in chloroform, an amount of epoxide sample calculated to react with about 50 percent of the pyridine hydrochloride. The bottle is then sealed and the contents heated in a steam bath for a period of about one hour. At the end of this time the bottle and contents are cooled, ten drops of phenophthalein indicator (1.0 gram per 100 milliliters of 60 percent ethanol) added, and the mixture titrated to a permanent red endpoint with a standard 0.2 N alcoholic potassium hydroxide solution. A blank is also run in precisely the same fashion without, however, the inclusion of a sample. From the titration data thus obtained, the amount of pyridine hydrochloride consumed by reaction with the epoxide sample can be calculated and from this the oxirane oxygen content can be determined.

The analyses in the examples for determining epoxidant, e.g., peracetic acid or acetaldehyde monoperacetate, content can be performed, for example, by introducing one to 1.5 grams of a sample of unknown epoxidant concentration into a flask containing a mixture of 60 milliliters of 50 weight percent aqueous sulfuric acid solution and five milliliters of a saturated potassium iodide solution. The flask is swirled to mix the solutions and then titrated immediately with a 0.1 N aqueous sodium thiosulfate solution to a colorless endpoint. From the titration data thus obtained, a determination of epoxidant content can be made.

Molecular weights of unsaturated polyesters wherever given in the examples were determined by the boiling point elevation method. The degrees of olefinic unsaturation of unsaturated polyesters prepared in the examples are indicated by iodine numbers as determined by the Wijs procedure. Olefinic double bond equivalents of unsaturated polyesters can be calculated from these iodine numbers. The acidity of unsaturated polyesters in the examples were determined by titrating a 1-gram sample of unsaturated polyester with a 1 N aqueous solution of base, such as, sodium hydroxide or potassium hydroxide, to a phenophthalein endpoint. Hydroxyl group contents of unsaturated polyesters were determined by the pyridine-phthalic anhydride or pyridine-acetic anhydride methods.

*Example 1*

A mixture containing 456 grams (3 moles) of 4-cyclohexene-1,2-dicarboxylic anhydride, 584 grams (4 moles) of 2-ethyl-1,3-hexanediol and 350 grams of toluene was heated under reflux at atmospheric pressure in a still kettle for 35 hours during which time water was continuously removed from the distillate. The toluene layer of the distillate was continuously returned to the reaction mixture in the still kettle. The temperature of the mixture rose from 114° C. to 177° C. during the course of the reaction period. After completion of the reaction, the mixture was distilled under reduced pressure to a final temperature of 145° C. at an absolute pressure of 6 millimeters of mercury. The residue polyester weighing 963 grams was a light yellow semi-solid which could not be poured at 25° C. It had a molecular weight of 785, acidity of 0.286 cubic centimeter of 1 normal base per gram of sample and an iodine number of 82.7.

*Example 2*

The polyester prepared as in Example 1 from 2-ethyl-1,3-hexanediol and 4-cyclohexene-1,2-dicarboxylic anhydride was dissolved in enough ethylbenzene to make a 47.3 weight percent solution. To eight hundred and forty-three grams of this solution (containing about 1.34 equivalents of double bonds) was added 1.68 moles of peracetic acid in a 23.5 weight percent solution in acetone over a period of 4 hours at 30° C. The reaction mixture was allowed to stand at room temperature for an additional 14 hours and then the volatile material was removed by stripping in a still under reduced pressure. The residue product was stripped to a kettle temperature of 110° C. at 4.0 millimeters of mercury, absolute pressure, and there remained 374 grams of a light yellow viscous material which was analyzed for epoxide groups. This analysis showed that 78 percent of the double bonds had been epoxidized.

In place of 2-ethyl-1,3-hexanediol of Example 1 propylene glycol, ethylene glycol, butylene glycol, triethylene glycol, 2,4-pentanediol, 2,5-hexanediol, polypropylene glycols, glycerol or pentaerythritol can be substituted. The polyesters thus obtained then can be epoxidized as described in Example 2 to produce useful products. Also, instead of 4-cyclohexene-1,2-dicarboxylic anhydride; 1,2-dimethyl-4-cyclohexene-1,2-dicarboxylic acid; 4-methyl-4-cyclohexene-1,2-dicarboxylic acid; 3,5,6-trimethyl-4-cyclohexene-1,2-dicarboxylic acid; 3-ethyl-4-cyclohexene-1,2-dicarboxylic acid or 3,3-diisopropyl-4-cyclohexene-1,2-dicarboxylic acid can be employed in making corresponding polyesters by the procedure of Example 1. These polyesters then can be epoxidized in a manner similar to Example 2 to produce useful products.

*Example 3*

A solution of 31.5 grams of a polyester such as that made in Example 1 in 31.5 grams of ethylbenzene was mixed with 40.4 grams of a 23.5 weight percent solution of peracetic acid in acetone and allowed to stand at room temperature for 3 days. The volatile materials were removed by stripping to a kettle temperature of 120° C. at 7 millimeters of mercury absolute pressure. A light-colored residue representing the product was analyzed for epoxide content by the pyridine-hydrochloride method and found to contain 3.9 weight percent oxirane oxygen.

*Example 4*

One mole of dipropylene glycol and two moles of 4-cyclohexene-1,2-dicarboxylic anhydride were reacted in a kettle for 1 to 2 hours at a temperature of 180° C. in the presence of xylene solvent to provide for the removal by azeotropic distillation of water formed by the reaction. Then three moles of 2-ethylhexanol were added to the kettle and the charge cooked until the acid number reached 2.5. This required ten hours. The mixture was then vacuum stripped to 170° C. at 1 millimeter of mercury absolute pressure to yield a residue polyester with an acidity of 2.1 cubic centimeters of 1 N base per gram of sample, a Gardner color of 1–2, and a viscosity on the Gardner-Holdt scale of G to H.

*Example 5*

A 23 weight percent solution of peracetic acid (4.1 moles) in acetone was added over a period of 2 hours to 1.37 moles of the polyester prepared in Example 4. The temperature of the reaction mixture was maintained at 40° C. by cooling with an ice bath when necessary. After an additional 4-hour reaction period at 40° C., an analysis for peracetic acid indicated that 98 weight percent of the theoretical amount of peracetic acid had been consumed. The reaction mixture was cooled and fed over a 3-hour period into a still kettle containing ethylbenzene under reflux at 65° C. to 70° C. and under reduced pressure. A distillate consisting of acetone, acetic acid, peracetic acid and ethylbenzene was removed continuously. At the conclusion of the feeding period the residue polyester was stripped free of ethylbenzene to a kettle temperature of 140° C. at a pressure of 2 millimeters, Hg, absolute pressure. An analysis for epoxide content showed that 85 percent of the double bonds had been epoxidized.

By employing the procedures of Examples 4 and 5 a polyester of dipropylene glycol 4-cyclohexene-1,2-dicarboxylic anhydride and crotyl alcohol can be epoxidized with similar results. Similarly, ethanol, butanol, hexanol, lauryl alcohol, myristyl alcohol, stearyl alcohol, allyl alcohol, pentenol, hexenol, nonenol, oleyl alcohol, linoleyl alcohol, linolenyl alcohol, cyclohexanol, can be employed in place of 2-ethylhexanol of Example 4 and the corresponding polyesters thus formed epoxidized according to Example 5 to produce useful products.

*Example 6*

Two hundred and ninety-two grams (2 moles) of 2-ethyl-1,3-hexanediol, 228 grams (1.5 moles) of 4-cyclohexene-1,2-dicarboxylic anhydride and 254 grams (0.9 mole) of oleic acid were refluxed at atmospheric pressure in a toluene solution and any evolved water was removed by means of a decanter. The reaction was allowed to continue for 77 hours at 152° C. to 174° C. and the reaction mixture was stripped in a gooseneck still to 185° C. at 2.5 millimeters of mercury absolute pressure and then steamed for one hour at 160° C. to 175° C. at 40 millimeters of mercury absolute pressure. The residue, representing 703 grams of polyester was very viscous but pourable at 25° C. and had the following properties:

| | |
|---|---|
| Color | 5 Gardner. |
| Acidity | 0.251 cubic centimeter of 1 N base/gram of sample. |
| Hydroxyl content | 0.72 percent (weight). |
| Iodine number | 82.5. |
| Molecular weight | 870. |

*Example 7*

A solution of 647 grams of the polyester formed in Example 6 in 300 grams of ethylbenzene was charged to a reaction flask, agitated, and heated to 40° C. Over a period of two hours, a total of 711 grams of a 24.7 percent by weight solution of peracetic acid in acetone was added to the polyester solution. The temperature was maintained at 40° C. for an additional 6 and ¾ hours. After this reaction period at a temperature of 40° C., an analysis for peracetic acid indicated that 98 percent of the theoretical amount of peracetic acid had been consumed. The volatile portion of the reaction mixture was stripped off under reduced pressure. The residue, representing 685 grams of product, had the following properties:

Acidity (calculated as acetic acid) _____ 0.06 percent (weight).
Iodine number _____ 3.66.
Gardner (1933) color _____ 3.
Oxirane oxygen content _____ 3.99 percent (weight).

The following monocarboxylic acids can be substituted for oleic acid in Example 6 for making polyesters which subsequently can be epoxidized using the procedure of Example 7: acetic acid, propionoic acid, caproic acid, lauric acid, palmitic acid, stearic acid, acrylic acid, methacrylic acid, undecylenic acid, linoleic acid, linolenic acid, cyclohexanecarboxylic acid, and benzoic acid.

*Example 8*

Propylene glycol in the amount of 152 grams (2 moles), 228 grams (1.5 moles) of 4-cyclohexene-1,2-dicarboxylic anhydride and 254 grams (0.9 mole) of oleic acid were refluxed in a toluene solution at atmospheric pressure and evolved water was removed by means of a decanter. The reaction was completed in 71 hours at 140° C. to 145° C. The reaction mixture was then stripped in a gooseneck still to 180° C. at 2 millimeters of mercury absolute pressure, followed by steaming for 2 hours at 150° C. to 190° C. at 50 millimeters of mercury absolute pressure. There were obtained 563 grams of polyester which was collected as residue. The polyester thus prepared was very viscous, but pourable at 25° C. and had the following properties:

Color _____ 6 Gardner.
Acidity _____ 0.601 cubic centimeter of 1 N base/gram of sample.
Hydroxyl _____ 0.86 percent (weight).
Iodine number _____ 103.
Molecular weight _____ 760.

*Example 9*

A solution of 437 grams of the polyester produced in Example 8 in 200 grams of ethylbenzene was charged to a reaction flask, agitated, and heated to 40° C. Over a period of 1.25 hours, 589 grams of a 25.3 percent by weight solution of peracetic acid in acetone was added to this polyester solution. A total reaction time of 8.25 hours at 40° C. was employed after which time the peracetic analysis indicated that 96 percent of the peracetic acid theoretically required to epoxidize all of the ethylenic double bonds had been consumed. The volatile portions of the reaction mixture were removed by distillation under reduced pressure. The residue, representing 462 grams of product, was a light-colored, viscous material having the following properties:

Color _____ 4 Gardner.
Acidity (calculated as acetic acid) _____ 1.0 percent (weight).
Iodine number _____ 4.7.
Oxirane oxygen content _____ 4.24 percent (weight).

*Example 10*

Seven hundred and thirty grams (5 moles) of a 2-ethyl-1,2-hexanediol, 304 grams (2 moles) of 4-cyclohexene-1,2-dicarboxylic anhydride and 376 grams (2 moles) of azelaic acid were refluxed at atmospheric pressure in a xylene solution and evolved water was removed from the system through a decanter. The reaction was allowed to continue for 68 hours at 159° C. to 183° C. At the end of this period, 1259 grams of residue, a yellow liquid, so viscous it would barely pour at 25° C., representing the polyester, was recovered by stripping the volatile portions of the reaction mixture in a gooseneck still to 190° C. at 4 millimeters of mercury absolute pressure. The polyester had the following properties:

Acidity _____ 0.189 cubic centimeter of 1 N base/gram of sample.
Iodine number _____ 40.8.
Molecular weight _____ 1070.

*Example 11*

A solution of 800 grams of the polyester prepared in Example 10 in 840 grams of ethylbenzene was heated to 40° C. Over a period of 3 hours and 20 minutes, 740 grams of a 20.8 percent by weight solution of peracetic acid in acetone was added to the polyester solution the temperature being maintained at 40° C. throughout the addition. After an additional 3 hours of reaction period at 40° C., the reaction mixture was allowed to stand overnight at room temperature. An analysis for peracetic acid indicated that 95 percent of the theoretical amount had been used. The reaction mixture was stripped of volatiles to a final kettle temperature of 110° C. at 3 millimeters of mercury absolute pressure. The residue, which represented the product, was a pale yellow, viscous liquid which contained 1.86 percent by weight of oxirane oxygen as determined by the pyridine-hydrochloride method of analysis for epoxide content. This corresponds to 75 percent of the available ethylenic double bonds being epoxidized.

In place of azelaic acid other dicarboxylic acid or anhydrides can be employed in accordance with the procedures of Examples 10 and 11 to produce useful products. Other dicarboxylic acids or anhydrides which may be substituted for azelaic acid include, succinic acid, glutaric acid, pimelic acid, sebacic acid, maleic acid, hexahydro-ortho-phthalic acid, phthalic acid and the like, and anhydrides thereof.

What is claimed is:

1. A polyester of a polyhydric alcohol, the polyester having the divalent acyl group of the general formula:

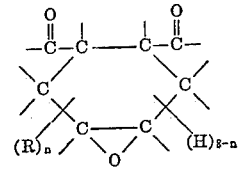

wherein R is an alkyl group, $n$ is an integer not greater than five, and the total number of carbon atoms contained by $(R)_n$ is not greater than twelve.

2. A polyester of a dihydric alcohol, the polyester having the divalent acyl group of the general formula:

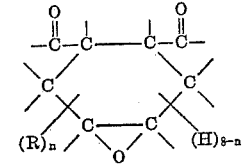

wherein R is an alkyl group, $n$ is an integer not greater than five, and the total number of carbon atoms contained by $(R)_n$ is not greater than twelve.

3. A polyester of a polyhydric alcohol, the polyester having the divalent acyl group of the formula:

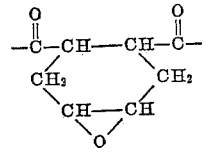

4. A polyester of a dihydric alcohol, the polyester having the divalent acyl group of the formula:

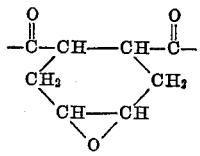

5. Oxirane oxygen-containing polyesters of members selected from the group consisting of 4-cyclohexene-1,2-dicarboxylic acid and the alkyl-substituted 4-cyclohexene-1,2-dicarboxylic acids and polyhydric alcohols wherein the oxirane oxygen is present in the 4,5-ring positions of the cyclohexane-1,2-dicarbonyl groups of said polyesters.

6. Oxirane oxygen-containing polyesters of 4-cyclohexene-1,2-dicarboxylic acid and the alkyl-substituted 4-cyclohexene-1,2-dicarboxylic acids, polyhydric alcohols and monocarboxylic acids wherein the oxirane oxygen is present in the 4,5-ring positions of the cyclohexane-1,2-dicarbonyl groups of said polyesters.

7. Oxirane oxygen-containing polyesters of 4-cyclohexene-1,2-dicarboxylic acid and the alkyl-substituted 4-cyclohexene-1,2-dicarboxylic acids, polyhydric alcohols and monohydric alcohols wherein the oxirane oxygen is present in the 4,5-ring positions of the cyclohexane-1,2-dicarbonyl groups of said polyesters.

8. The oxirane oxygen-containing polyesters of claim 5 wherein at least about 50 percent of the oxirane oxygen contained thereby is attached to the 4,5-ring positions of the cyclohexane-1,2-dicarbonyl groups of said polyesters.

9. The oxirane oxygen-containing polyesters of claim 6 wherein at least about 50 percent of the oxirane oxygen contained thereby is attached to the 4,5-ring positions of the cyclohexane-1,2-dicarbonyl groups of said polyesters.

10. The oxirane oxygen-containing polyesters of claim 7 wherein at least about 50 percent of the oxirane oxygen contained thereby is attached to the 4,5-ring positions of the cyclohexane-1,2-dicarbonyl groups of said polyesters.

11. Oxirane oxygen-containing polyesters of members selected from the group consisting of 4-cyclohexene-1,2-dicarboxylic acid and the alkyl-substituted 4-cyclohexene-1,2-dicarboxylic acids and polyhydric alcohols having at least 10 percent of the total number of diacyl groups of said polyester derived from said members and wherein the oxirane oxygen is present in the 4,5-ring positions of the cyclohexane 1,2-dicarbonyl groups of said polyesters.

12. Oxirane oxygen-containing polyesters of members selected from the group consisting of 4-cyclohexene-1,2-dicarboxylic acid and the alkyl-substituted 4-cyclohexene-1,2-dicarboxylic acids, polyhydric alcohols and aliphatic olefinically unsaturated monocarboxylic acids having at least 10 percent of the total number of diacyl groups of said polyester derived from said members and wherein the oxirane oxygen is present in the 4,5-ring positions of the cyclohexane-1,2-dicarbonyl groups of said polyesters.

13. An oxirane oxygen-containing polyester of 4-cyclohexene-1,2-dicarboxylic acid, and 2-ethyl-1,3-hexanediol wherein the oxirane oxygen is attached to the 4,5-ring positions of the cyclohexane-1,2-dicarbonyl groups of said polyester.

14. An oxirane oxygen-containing polyester of 4-cyclohexene - 1,2 - dicarboxylic acid, 2 - ethyl - 1,3 - hexanediol and oleic acid wherein an oxirane oxygen is attached to the 4,5-ring positions of the cyclohexane-1,2-dicarbonyl groups of said polyester.

15. An oxirane oxygen-containing polyester of 4-cyclohexene-1,2-dicarboxylic acid, propylene glycol and oleic acid wherein an oxirane oxygen is attached to the 4,5-ring positions of the cyclohexane-1,2-dicarbonyl groups of said polyester.

16. An oxirane oxygen-containing polyester of 4-cyclohexene-1,2-dicarboxylic acid, dipropylene glycol and 2-ethylhexanol, wherein the oxirane oxygen is attached to the 4,5-ring positions of the cyclohexane-1,2-dicarbonyl groups of said polyester.

References Cited in the file of this patent

UNITED STATES PATENTS

| | | |
|---|---|---|
| 1,860,730 | Brooks | May 31, 1932 |
| 2,251,298 | Soday | Aug. 5, 1941 |
| 2,660,563 | Banes et al. | Nov. 24, 1953 |